(12) United States Patent
Brumer et al.

(10) Patent No.: US 9,443,332 B2
(45) Date of Patent: Sep. 13, 2016

(54) REDRAWING RECENT CURVE SECTIONS FOR REAL-TIME SMOOTHING

(71) Applicant: Microsoft Corporation, Redmond, WA (US)

(72) Inventors: Eric Brumer, Kirkland, WA (US); Jorge Pereira Pedreira, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 15/010,846

(22) Filed: Jan. 29, 2016

(65) Prior Publication Data
US 2016/0148403 A1    May 26, 2016

Related U.S. Application Data

(63) Continuation of application No. 13/780,653, filed on Feb. 28, 2013, now Pat. No. 9,286,703.

(51) Int. Cl.
*G06T 11/20* (2006.01)
*G06T 5/00* (2006.01)

(52) U.S. Cl.
CPC ............ *G06T 11/203* (2013.01); *G06T 5/002* (2013.01); *G06T 2200/28* (2013.01)

(58) Field of Classification Search
None
See application file for complete search history.

(56) References Cited

U.S. PATENT DOCUMENTS

| | | |
|---|---|---|
| 5,615,319 A | 3/1997 | Metzger et al. |
| 5,877,743 A | 3/1999 | Dzik |
| 5,940,082 A | 8/1999 | Brinegar et al. |
| 7,057,615 B2 | 6/2006 | Wang et al. |
| 7,623,998 B1 | 11/2009 | Yu |
| 8,643,650 B1 | 2/2014 | Vinchon et al. |
| 2002/0064308 A1 | 5/2002 | Altman et al. |
| 2002/0089521 A1 | 7/2002 | Maruyama et al. |
| 2003/0025713 A1 | 2/2003 | Wang et al. |
| 2005/0289452 A1 | 12/2005 | Kashi et al. |

(Continued)

OTHER PUBLICATIONS

Mohamed, Khaireel A., "Concepts and Solutions for Efficient Handling of the Digital Ink", Retrieved at <<http://www.freidok.uni-freiburg.de/volltexte/7361/pdf/thesis_final_khaireel_a_mohamed_Mar_2010.pdf>>, Mar. 25, 2009, pp. 270 [available in U.S. Appl. No. 13/780,653, filed Feb. 28, 2013].

(Continued)

*Primary Examiner* — Ke Xiao
*Assistant Examiner* — Jed-Justin Imperial
(74) *Attorney, Agent, or Firm* — Kevin Sullivan; Kate Drakos; Micky Minhas

(57) ABSTRACT

A recently rendered section of a curve is redrawn to smooth the curve on-the-fly while a user moves a stylus or other input device. On receiving data points for the curve, an old rendered section for prior data points is deleted by curve redrawing code, and a new spline that's visually smooth through the new data points and at least one prior data point is added. "Visually smooth" is defined using tangents. The rendered spline is a cardinal or other cubic Hermite spline. The curve is redrawn for display by overwriting frame buffer data. A single instruction multiple data processing architecture simultaneously calculates multiple data points for the new section of the curve rendering. A digital ink rendering uses a pen-tip shape or an arc shape, based on data point locations. The pen-tip shape simulates a square-tip pen, highlighter, pencil, charcoal, paintbrush, or liquid ink pen.

20 Claims, 3 Drawing Sheets

(56) References Cited

U.S. PATENT DOCUMENTS

| | | |
|---|---|---|
| 2007/0172125 A1 | 7/2007 | Walch |
| 2009/0201295 A1 | 8/2009 | Kripac et al. |
| 2010/0079602 A1 | 4/2010 | Napper et al. |
| 2011/0199297 A1 | 8/2011 | Antonyuk et al. |
| 2012/0050293 A1 | 3/2012 | Carlhian et al. |
| 2012/0105383 A1 | 5/2012 | Silverbrook et al. |
| 2013/0226966 A1* | 8/2013 | Shmueli ............ G06F 17/30545 707/770 |
| 2014/0047356 A1 | 2/2014 | Ameller-Van-Baumberghen et al. |

OTHER PUBLICATIONS

Henzen, et al., "Sketching with a Low-latency Electronic Ink Drawing Tablet", Retrieved at <<http://citeseerx.ist.psu.edu/viewdoc/download?doi=10.1.1.103.7677&rep=rep1&type=pdf>>, in the 3rd International Conference on Computer Graphics and Interactive Techniques in Australasia and South East Asia, Nov. 2005, pp. 10.

"Outlier", Retrieved at <<http://en.wikipedia.org/wiki/Outlier>>, Feb. 19, 2013, 5 pages.

"Chapter 4 Curves: Extract: Quadratic Bézier Spline", Retrieved at <<http://www.learnsvg.com/books/learnsvg/html/bitmap/chapter04/page04-1.php>>, copyright 2002-2011, 4 pages.

"Bézier curve", Retrieved at <<http://en.wikipedia.org/wiki/Bézier_curve>>, Dec. 30, 2012, 8 pages.

"Cubic Hermite spline", Retrieved at <<http://en.wikipedia.org/wiki/Cubic_Hermite_spline#Cardinal_spline>>, Dec. 15, 2012, 4 pages.

Ghoting, Amol, Srinivasan Parthasarathy, and Matthew Eric Otey. "Fast mining of distance-based outliers in high-dimensional datasets." Data Mining and Knowledge Discovery 16.3 (2008): 349-364.

Mohamed, Khaireel A. Concepts and solutions for efficient handling of the digital ink. Diss. Albert-Ludwigs-Universitat Freiburg, 2009.

"Understanding the parallelism of GPUs", retrieved from <<http://renderingpipeline.com/2012/11/understanding-the-parallelism-of-gpus/>>, Nov. 9, 2012, 4 pages.

\* cited by examiner

REDRAWING RECENT CURVE SECTIONS FOR REAL-TIME SMOOTHING

RELATED APPLICATION

The present application claims priority to, and incorporates herein by reference the entirety of, U.S. patent application Ser. No. 13/780,653 filed Feb. 28, 2013.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As a stylus, a motion-capture target, or another pen-tip moves through a two-dimensional (or a three-dimensional) space, the pen-tip's location can be sampled, thereby providing data points through which a motion path, a digital ink path, and/or another curve can be rendered. Depending on factors such as the speed of the pen-tip, the path followed by the pen-tip, and the sampling rate, the data points may be either more or less accurate in their approximation of the actual path followed. Sometimes that accuracy is the most important criterion for evaluating a curve which is rendered (visually or virtually) through or near the data points. The foregoing observations are made with the present claims in mind. Accordingly, one of skill in the art who did not have access to the claims would not necessarily have recognized the various uses to which data points and rendered curves can be put.

SUMMARY

Criteria other than path accuracy may also be important in determining the desirability of a curve rendering with regard to a set of data points in a given situation. Criteria may include, for example, the apparent or measured smoothness of the curve rendering, how soon after the data points are sampled the curve is rendered, and whether the curve is produced in one version or in multiple renderings. This last criterion can also be viewed as asking whether a single curve, or a succession of curves, or a successively refined curve, is produced from the data points. In short, there may be many different ways to render a curve from a set of data points. In addition, the question arises of whether the rendered curve is to be displayed visually and/or is meant to be used for some other purpose such as animation or motion control.

Some embodiments described herein are directed to the technical problem of making a rendered curve appear smooth while the curve is being drawn by a user, instead of waiting for a pen-tip to stop moving and only then rendering a smooth curve through sampled data points. Rendering a smooth curve on-the-fly is harder than rendering it after all data points are in, because less pen-tip location data is available to work with, and also because rendering calculations are being done in real-time so the user does not perceive a lag in responsiveness while moving the pen-tip. Some embodiments implement a compromise, in which only a most recent section of a rendered curve is redrawn to smooth the curve, so the smoothing is computationally feasible but visible rendering does not lag far enough behind the data point sampling to disturb an ordinary human user's sense of control over what is being drawn.

Some embodiments provide automated curve smoothing, for use in displaying a rendered curve or for other uses such as motion control curves, animation curves, and building surfaces in a three-dimensional space. Some redraw a digital ink curve to smooth it as the user interacts with a digital ink display using a stylus, a fingertip, or another drawing tool. For instance, some use rendered splines to smooth the digital ink curve by redrawing a recent section of the curve (deleting an old section and adding a new section) in real-time as the curve is being interactively rendered on a digital display for a user of a machine that contains the display.

One embodiment is performed by a machine which includes a computer-readable memory. The embodiment gets into the computer-readable memory a data point Pn for a curve. The data point Pn is the most recent data point in a sequence S of data points for the curve; the curve has a curve rendering which corresponds to the sequence S. The embodiment deletes an old section of the curve rendering and adds a new section to the curve rendering; these changes may be made in turn or made simultaneously. The size of the old section and the size of the new section are the same as one another in some embodiments, but differ in other embodiments. The number of new points gotten before deleting an old section is one in some embodiments, and more than one in other embodiments. More formally, the deleted old section corresponds to at least q data points immediately prior to Pn in the sequence S, where q is a whole number greater than zero. The new section includes a rendered spline that has a portion which is visually smooth through the q data points immediately prior to the new data point Pn and also visually smooth through Pn (definitions for "visually smooth" are given in the Detailed Description below). In some embodiments, n is at least 3, and in some embodiments n is at least 4. In some, n=3 and q=1.

Some embodiments repeat the deleting and adding steps incrementally progressing along the curve as more data points are gotten from the input device. For example, some get a data point Pn+1 for the curve, and repeat the deleting and adding steps with Pn+1 taking the place of Pn. Some embodiments get new data points Pn through Pn+r, where r is a whole number greater than 1, and repeat the deleting and adding steps with the added section based on (and visually smooth through) the multiple new data points Pn through Pn+r, rather than being based on (and visually smooth through) only one new data point Pn. Some embodiments use rendered splines to smooth the curve by redrawing a section of the curve (namely, deleting the old section and adding the new section) in real-time as data points are being added to the sequence S.

In some embodiments, the rendered splines are each one at least one of the following: a cubic Hermite spline with finite difference tangents, a cardinal spline, a Catmull-Rom spline; in some of these embodiments, n is at least 4. In some embodiments, the splines are cardinal splines and n equals 4.

In some embodiments, the curve rendering includes at least two shapes: a pen-tip shape which was rendered at locations in a digital display of the machine corresponding to the data points, and an arc shape which was rendered along arcs between the locations that correspond to the data points. In some embodiments, the pen-tip shape simulates at least one of the following: a square-tip pen, a highlighter, a pencil, a charcoal, a paintbrush, a liquid ink pen. In some, the pen-tip shape is a circle or an ellipse, and the arc shape is a set of end-to-end rectangles. Some embodiments switch between two shapes in the curve rendering based at least in part on how far apart new data points are in the sequence S during user interaction with the machine, e.g., using the pen-tip shape when data points are within a predefined distance of one another and otherwise using the arc shape.

In some embodiments, the machine includes a digital display having a frame buffer, and the steps of deleting an old section of the curve rendering and adding a new section to the curve rendering are performed at least in part by overwriting a portion of frame buffer old data with frame buffer new data from a checkpoint forward. The frame buffer old data represented the old section of the curve rendering, and the frame buffer new data represents the new section of the curve rendering. Thus, overwriting with the new data can simultaneously delete the old section and add the new section.

In some embodiments, the machine includes a single instruction multiple data processing architecture. Some embodiments simultaneously calculate multiple data points for the new section of the curve rendering, using the single instruction multiple data processing architecture. In some embodiments, the machine includes a graphics processor, and the step of adding a new section to the curve rendering on the digital display includes calculating rendered spline data using the graphics processor. The graphics processor may or may not be part of a single instruction multiple data processing architecture, depending on the embodiment.

Some embodiments include at least one logical processor, an instruction memory in operable communication with the logical processor, a digital ink display having a frame buffer in operable communication with the logical processor, and a curve redrawing code. The curve redrawing code resides in the instruction memory and will redraw a digital ink curve when executed by the logical processor(s) and/or will otherwise smooth a curve in real-time as discussed above. The logical processor(s) may have a single instruction multiple data processing architecture, which the curve redrawing code uses to simultaneously calculate frame buffer data for multiple data points for the new section of the curve rendering. Other capabilities discussed herein may also be present.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
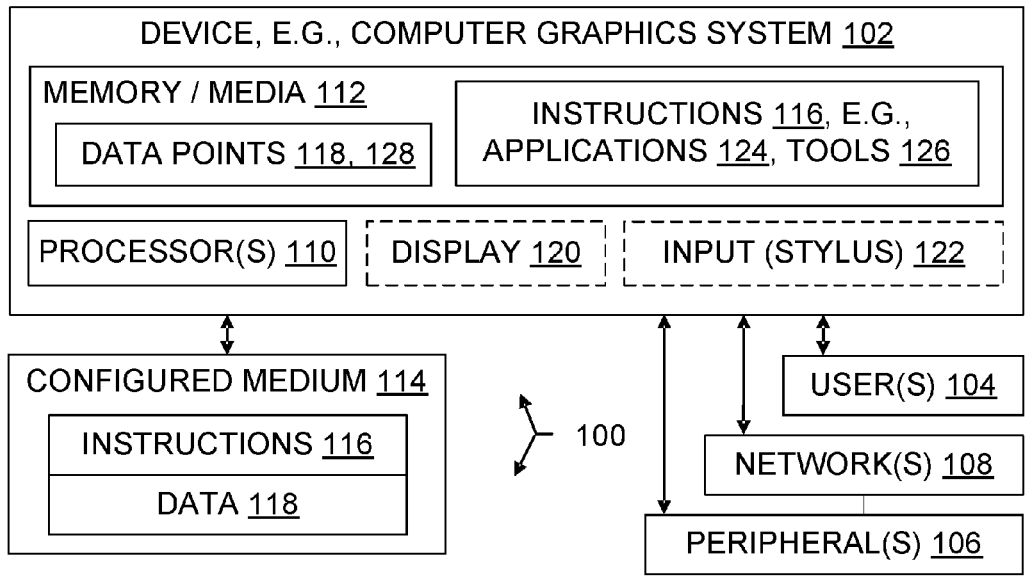
FIG. 1 is a block diagram illustrating a computer graphics system having at least one processor and at least one memory which interact with one another under the control of graphics software, and other items in an operating environment which may be present on multiple network nodes, and also illustrating configured storage medium (as opposed to mere signal) embodiments.

One of the challenges of rendering digital ink is ensuring the resulting strokes are smooth. When the locations of a user input device are captured at a sample rate, and without smoothing, it may occur that sections of the resulting curve are not rendered realistically if the user writes very quickly. Instead, the curve looks like it is made of a collection of straight-line segments. This is not visually appealing.

One solution for smoothing is provided in the Microsoft® Windows® 8 ink API (application program interface), which provides full stroke post-processing smoothing based on Bezier curves. ("Microsoft", "Windows", and "Windows 8" are marks of Microsoft Corporation.) Bezier curves help ensure the resulting line is mathematically smooth, but there are some downsides. The Bezier curve of a set of points is not guaranteed to pass through those points—it is meant to be a mathematically smooth approximation to those points. Thus, the fidelity of the user's information can be lost—the points where the user's stylus touched may not be points on the resulting smoothed curve. The Bezier curve of a set of points is also based on the entire set of points, so all data points are obtained prior to any smoothing. Thus, the digital ink is not smoothed in real-time. That is to say, it is only after the user lifts their stylus off the screen—after drawing a stroke—that the stroke is smoothed. From a user experience perspective, it is disconcerting to have previous strokes change significantly after you have written them, so writing comfortably with a stylus can be unrealistic when real-time smoothing is unavailable. Thus, a real-time and low latency technology for digital ink smoothing would be helpful.

Some embodiments described herein may be viewed in a broader context. For instance, concepts such as rendering, sampling, splines, and switching between shapes may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving rendering, sampling, splines, and/or switching between shapes are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as maintaining curve fidelity and performing real-time smoothing of a curve as the curve is being entered by a user's stylus or other input device. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein use SIMD (single instruction multiple data) processing to calculate spline data, and some use real-time spline calculations. Third, technical effects provided by some embodiments include visibly smoother curves on tablet screens and other displays. Fourth, some embodiments include technical adaptations such as frame buffer checkpoints for redrawing only the most recent section of a curve. Fifth, technical advantages of some embodiments include improved usability of interfaces that utilize hand-drawn curves, and faster processing of spline data.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "visually smooth" has various definitions, so the particular definition to be used in a given circumstance or a given claim is often expressly stated herein, and a default description is also designated for use when no other definition is expressly stated. The available express definitions follow:

(a) In some circumstances a portion of a rendered spline having tangents is considered "visually smooth" when the portion has no visible discontinuity in its tangents. Visibility to a person of the curve portion, but not necessarily of the tangents, is part of this definition. The tangents may themselves already be visible, or may be visualized for the purpose of testing smoothness.

(b) In some circumstances, a portion of a rendered spline is considered "visually smooth" when any two parts of the portion which meet at a point share a common tangent direction at the point where those two parts meet. Visibility of actual tangents or of curve portions is not required under this definition.

(c) When no other particular definition is expressly stated, the definition to be used is the following: a portion of a rendered spline is considered "visually smooth" when the portion has $G^1$ continuity. Two curve portions have $G^1$ continuity if and only if they have the same tangent where they meet. Visibility of actual tangents or of curve portions is not required under this definition.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, calculating, checkpointing, deleting, displaying, getting, having, including, overwriting, performing, processing, redrawing, rendering, simulating, smoothing, switching, using (or adds, added, calculates, calculated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. No claim covers a propagated signal per se. A memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. As used herein, "computer readable medium" means a computer readable storage medium, and therefore means the medium is not a propagating signal per se.

Operating Environments

With reference to FIG. 1, an operating environment 100 for an embodiment may include a computer graphics system 102. The computer graphics system 102 may be a multiprocessor computer system, or not. An operating environment may include one or more machines in a given computer system, which may be clustered, client-server networked, and/or peer-to-peer networked. An individual machine is a computer graphics system, and a group of cooperating machines is also a computer graphics system. A given computer graphics system 102 may be configured for end-users, e.g., with applications, for administrators, as a server, as a distributed processing node, and/or in other ways.

Human users 104 may interact with the computer graphics system 102 by using displays 120, keyboards, and other peripherals 106 (including a stylus, pen, touchscreen, motion capture device, and/or other curve input device 122), via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, instructions 116 for a game application 124 may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer graphics system 102 or with another system embodiment using one or more connections to a network 108 via network interface equipment, for example.

The computer graphics system 102 includes at least one logical processor 110. The computer graphics system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media (as opposed to merely a propagated signal). In particular, a configured medium 114 such as a CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as user movements, product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device 102 (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 124 and/or tools 126 have code for performing graphics operations such as defining, displaying, or editing curves in 2-dimensional or 3-dimensional spaces. Software The applications 124, tools 126, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s)

120, data point input devices 122, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
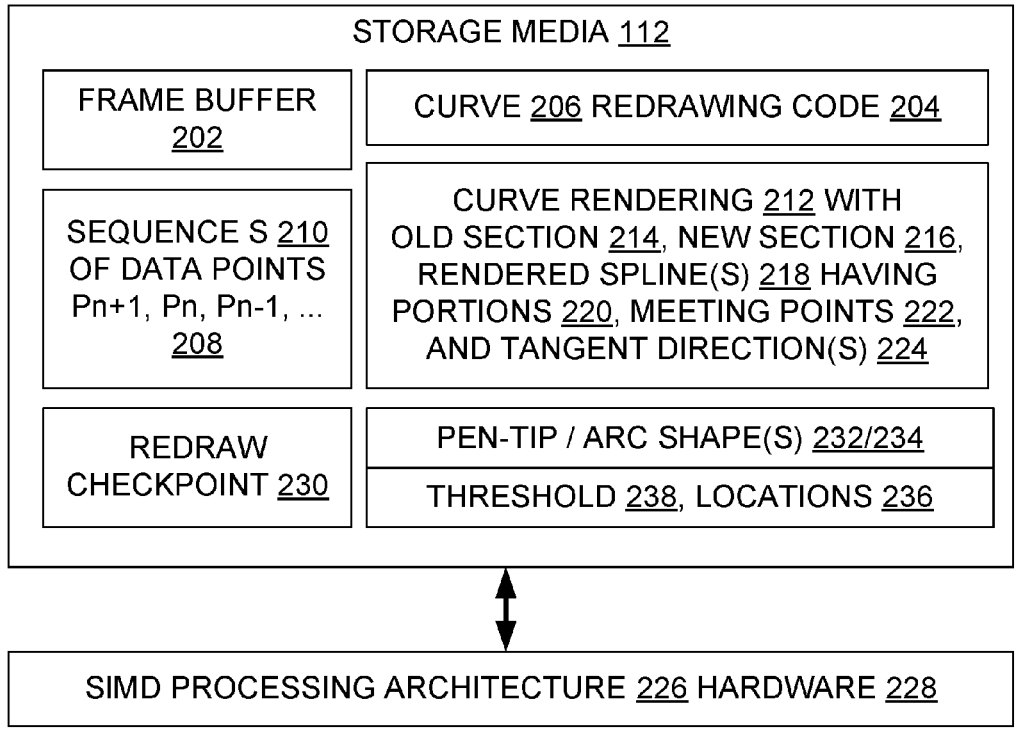
FIG. 2 is a block diagram illustrating curve redrawing code in an example architecture.

FIG. 2 illustrates aspects of an architecture which is suitable for use with some embodiments. Some embodiments include at least one logical processor 110, an instruction memory 112 in operable communication with the logical processor, and a digital ink display, vector graphics display, or other display 120. Some displays 120 have a frame buffer 202 in operable communication with the logical processor 110. A frame buffer 202 is a kind of memory 112. Some embodiments include a curve redrawing code 204 for redrawing part of a curve 206 which is defined at least in part by data points 118, 128 received from a stylus or other input 122. The curve redrawing code resides in the instruction memory, and when executed by the logical processor(s) 110 it will redraw a digital ink curve or other curve 206, and/or will otherwise smooth a curve 206 in real-time as discussed herein.

One embodiment gets in the computer-readable memory 112 a data point Pn for a curve. The data point Pn is the most recent data point 208 in a sequence S (also denoted 210) of data points for the curve. The curve 206 has a curve rendering 212 which corresponds to the sequence 210. In operation, the embodiment deletes an old section 214 of the curve rendering and adds a new section 216 to the curve rendering. The deleted old section corresponds to at least q data points 208 immediately prior to Pn in the sequence S, it may be delineated in memory by a checkpoint 230. The new section includes a rendered spline 218 that has a portion 220 which is visually smooth through Pn and the q preceding data points. In some embodiments, n is 3, in some n is 4, and in some embodiments n is at least 4. In some embodiments, the deleted old section corresponds to q consecutive data points up to and including data point Pn−1, where q is a whole number greater than one. In some embodiments, a portion of a rendered spline is considered "visually smooth" when any two parts of the portion which meet at a point 222 share a common tangent direction 224 at the point where those two parts meet.

In some embodiments, the logical processor(s) 110 may have a single instruction multiple data (SIMD) processing architecture 226, which includes SIMD hardware 228 that software instructions can be written to utilize. In some embodiments, the curve redrawing code 204 uses SIMD processing to simultaneously calculate frame buffer data for multiple data points for the new section 216 of the curve rendering.

In some embodiments, the rendering 212 contains multiple shapes (in addition to fundamental triangles from which all shapes are built), such as a pen-tip shape 232 and an arc shape 234. In other embodiments, only a single rendering shape is used, e.g., a rectangle. In some embodiments, the curve redrawing code 204 switches between two shapes based on whether successive data point screen locations 236 are closer than a predetermined threshold 238. For instance, a pen-tip shape may be used when the stylus is moving slowly while an arc shape is used when the stylus is moving more rapidly.

With reference to FIGS. 1 and 2, some embodiments provide a computer system 102 with a logical processor 110 and a memory medium 112 configured by circuitry, firmware, and/or software to provide technical effects such as curves that are largely or fully smoothed prior to a pen-tip lifting from the input surface. Some embodiments are directed at technical problems such as real-time visually appealing curve smoothing. Some embodiments extend existing graphics functionality with curve redrawing capabilities described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. Some embodiments operate in a "cloud" computing environment and/or a "cloud" storage environment in which computing services are not owned but are provided on demand. An embodiment may also communicate technical data and/or technical instructions through direct memory access, removable nonvolatile media, or other information storage-retrieval and/or transmission approaches, or an embodiment in a computer system may operate without communicating with other computer systems.

Processes

Figure 3:
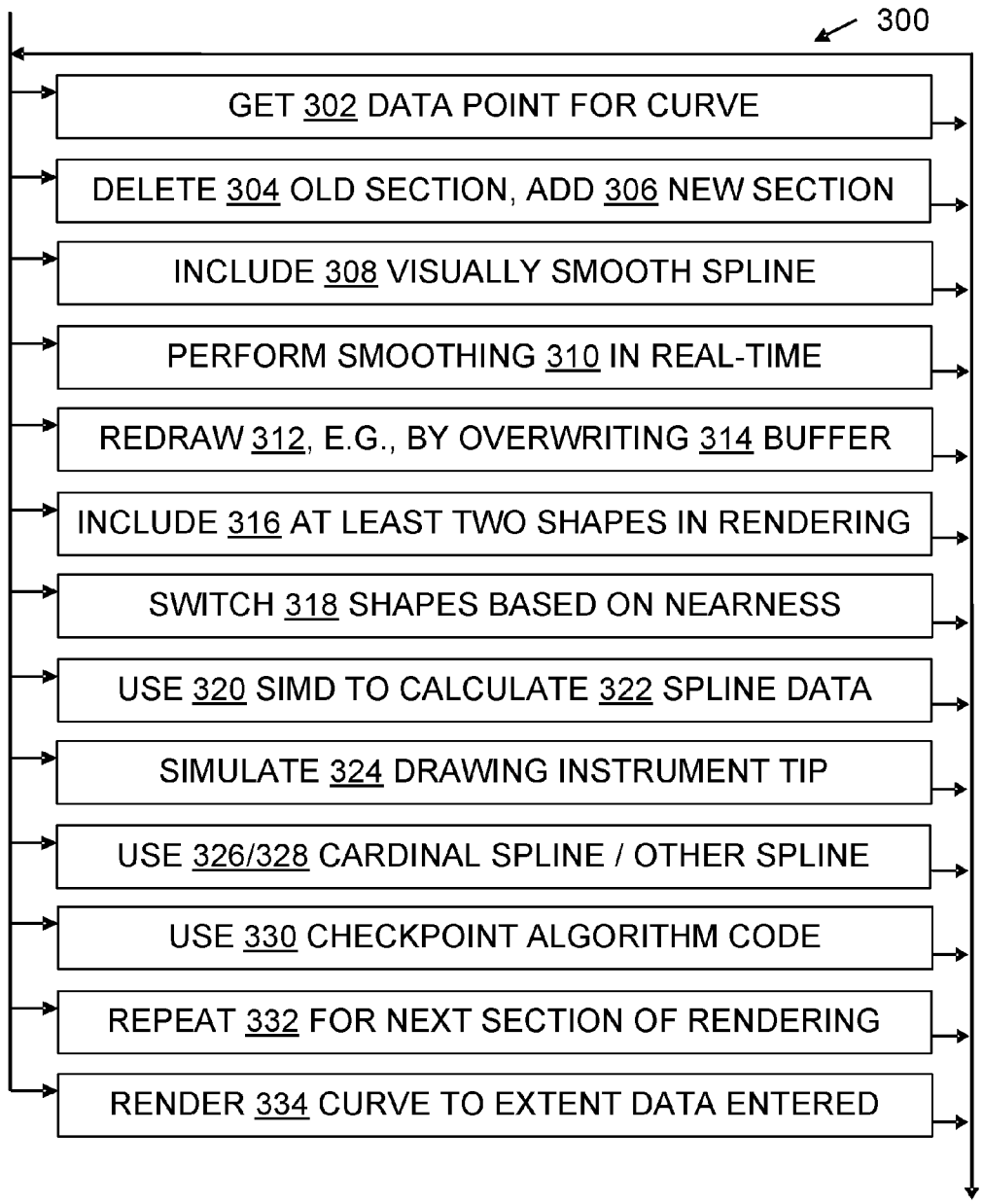
FIG. 3 is a flow chart illustrating steps of some process and configured storage medium embodiments.

FIG. 3 illustrates some process embodiments in a flowchart 300. Technical processes shown in the Figures or otherwise disclosed may be performed in some embodiments automatically, e.g., by an application 124 under control of a testing script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some processes can be performed by a machine such as a system 102 which includes a computer-readable memory 112. One embodiment gets 302 into the computer-readable memory a data point Pn for a curve. The data point Pn is the most recent data point in a sequence S of data points 208 for the curve; the curve has a curve rendering 212 which corresponds to the sequence S. The embodiment deletes 304 an old section of the curve rendering and adds 306 a new section to the curve rendering; these changes 304 and 306 may be made in turn (in either order) or they may be made simultaneously, depending on the embodiment and circumstances. The deleted old section corresponds to at least one data point immediately prior to Pn in the sequence S. The new section includes 308 a rendered spline that has a portion which is visually smooth through the data points of the deleted old section and also visually smooth through data point Pn (per one of the "visually smooth" definitions provided above). In some embodiments, data points Pn through Pn+r define the new section, r being a whole number greater than 1. In some, the new section includes 308 a rendered spline that has a portion which is visually smooth through the data points of the deleted old section and also visually smooth through data points Pn through Pn+r, and the deleting-adding steps occur after getting each group of r new data points instead of occurring after getting 302 only one new data point.

Some embodiments then get 302 a data point Pn+1 for the curve, and repeat 332 the deleting and adding steps with Pn+1 taking the place of Pn. Some embodiments use 326/328 rendered splines to smooth 310 the curve by redrawing 312 a section of the curve (namely, deleting the old section and adding the new section) in real-time as data points are being added to the sequence S.

In some embodiments, the rendered splines are each one at least one of the following: a cubic Hermite spline with finite difference tangents, a cardinal spline, a Catmull-Rom spline; in some of these embodiments, n is at least 4. In some embodiments, the splines used 326 are cardinal splines, n equals 4, and the adding-deleting steps occur after each new data point is gotten 302.

In some embodiments, the curve rendering includes 316 at least two shapes: a pen-tip shape 232 which was rendered 334 at locations 236 in a digital display 120 of the machine corresponding to the data points 208, and an arc shape 234 which was rendered 334 along arcs between the locations that correspond to the data points. In some embodiments, the pen-tip shape 232 simulates 324 at least one of the following: a square-tip pen, a highlighter, a pencil, a charcoal, a paintbrush, a liquid ink pen. In some, the pen-tip shape is a circle or an ellipse, and the arc shape is a set of end-to-end rectangles. Some embodiments switch 318 between two shapes in the curve rendering, based at least in part on how far apart new data points are in the sequence S during user interaction with the machine, e.g., using the pen-tip shape when data point locations 236 are within a predefined distance (per threshold 238) of one another, and otherwise using the arc shape.

In some embodiments, the machine includes a digital display having a frame buffer 202, and the steps of deleting an old section of the curve rendering and adding a new section to the curve rendering are performed using 330 code 204 that (among other things) uses 330 a checkpoint algorithm. The checkpoint algorithm includes overwriting 314 a portion of frame buffer old data with frame buffer new data from a checkpoint 230 forward. The frame buffer old data represented the old section of the curve rendering, and the frame buffer new data represents the new section of the curve rendering. Thus, overwriting 314 with the new data can simultaneously delete 304 the old section and add 306 the new section.

In some embodiments, the machine includes a single instruction multiple data (SIMD) processing architecture 226. Some embodiments simultaneously calculate 322 multiple data points for the new section of the curve rendering, using 320 the single instruction multiple data processing architecture. In some embodiments, the machine includes a graphics processor 110 (GPU), and the step of adding 306 a new section to the curve rendering on the digital display includes calculating 322 rendered spline data using the graphics processor. The graphics processor may or may not be part of a single instruction multiple data processing architecture, depending on the embodiment. That is, a given embodiment may use SIMD, or use a GPU, or do both.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as curve redrawing code 204, a redraw checkpoint 230, and/or multiple rendering shapes 232 and 234, in the form of data 118 and instructions 116, read from a removable medium 114 and/or another source such as a network connection, to form a configured medium. The configured medium 112 is capable of causing a computer system to perform technical process steps for smoothing a curve by redrawing a recently rendered section of the curve as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some embodiments described herein present techniques for rendering smoothed ink strokes in real time and with low latency. Multiple pieces of technology are used in various combinations, such as digital ink rendering by rendering round stamps and rectangles, creating a single checkpoint for a vertex buffer and reverting back to this checkpoint, using a cardinal spline to draw a smoothed segment between the middle two points of four points, and/or using SIMD cpu instructions for performance.

Figure 4:
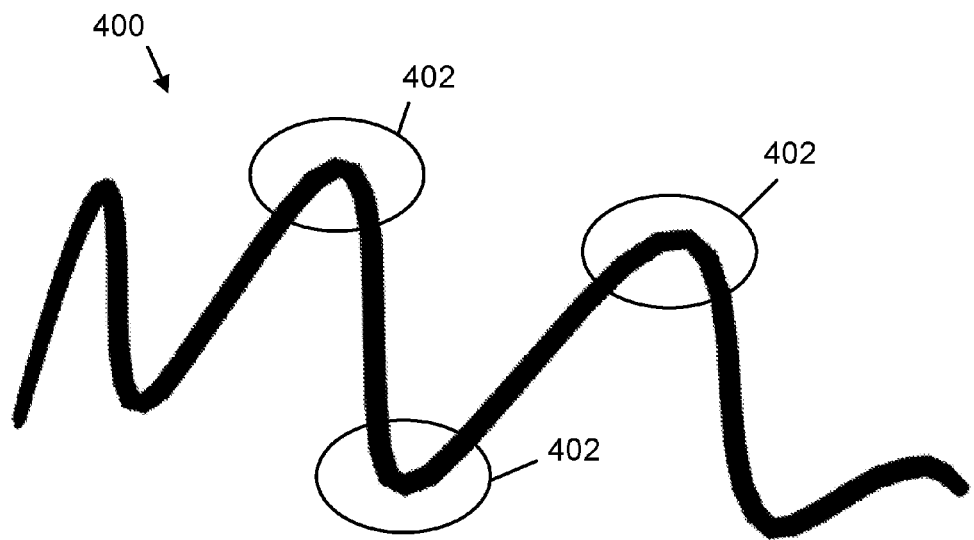
FIGS. 4 and 5 show corresponding rendered curves; in one (FIG. 4) curve redrawing has not been performed, while in the other (FIG. 5) curve redrawing has been performed.
Figure 5:
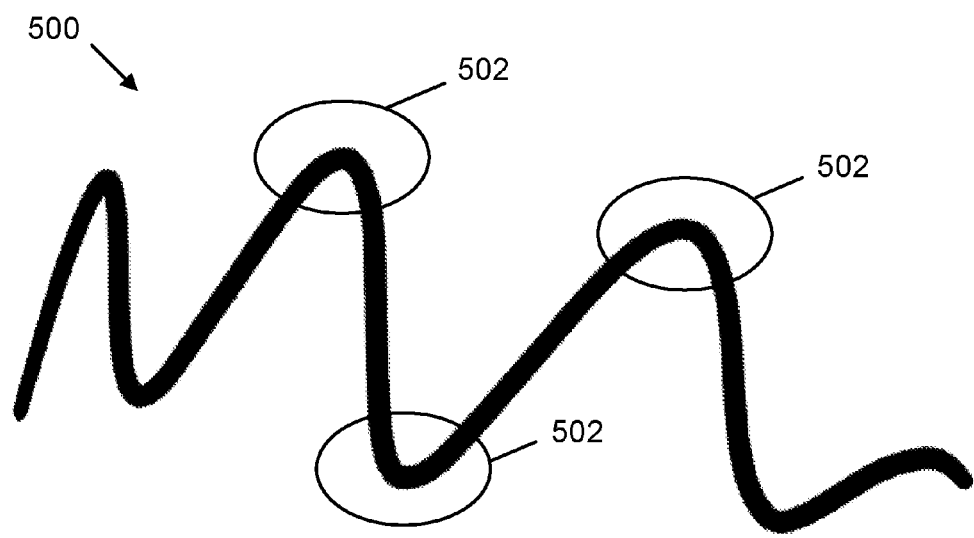

Implementations using these techniques can provide a marked improvement in the quality of ink strokes rendered. The strokes are more visually appealing than without smoothing, and there is no loss in runtime performance. FIGS. 4 and 5 illustrate the potential improvement. FIG. 4 shows a curve 400 drawn by hand on a tablet running prototype code but with curve smoothing turned off. Several portions of the curve 400, such as those indicated by reference numeral 402, are not visually smooth (under any of the definitions above). FIG. 5 shows a corresponding curve 500, drawn with curve smoothing 310 code turned on; each of the previously non-smooth portions 402 have been replaced by visually smooth portions 502.

In addition to smoothing 310, some embodiments perform digital ink rendering 334 (a curve 206 may also be rendered 334 only to RAM in some embodiments, which does not require digital ink). Assume that user input from a stylus (or other input device 122 such as a finger sensor) is captured at a sample rate. As points are read in by the ink driver, shapes are drawn to the screen, in the locations 236 captured from the stylus.

A technique for rendering ink strokes to digitally simulate 324 a felt-tip pen can be done efficiently by rendering two shapes. A round stamp (one possible pen-tip shape 232) is rendered at the start of the ink stroke, simulating pressing a felt-tip pen on a piece of paper, and is rendered at the end of the ink stroke. Rectangular segments (one possible arc shape 234) are rendered at any points between the first and last point. As input points are read in, the following occurs. When the first ink point is read ($P_1$), render 334 a round stamp at the point location. When the next ink point is read ($P_2$), render a rectangular segment from $P_1$ to $P_2$, checkpoint 330 the vertex buffer 202, and then render a round stamp at $P_2$. As next points are read ($P_n$), revert 304 the vertex buffer back to the checkpoint (effectively deleting the round stamp at $P_{n-1}$), render a line segment from $P_{n-1}$ to $P_n$, checkpoint the new vertex buffer (effectively adding 306 a section), and then render a round stamp at $P_n$ (increasing the added section).

FIG. 4 shows this technique being used to render a curvy line segment on a tablet system 102 with a stylus sample rate of 120 Hz. Portions 402 are indicated to show that this technique—when used alone—produces a curve that has portions which are clearly visible as the concatenation of rectangles. This is not visually appealing.

Now consider the use 326 of cardinal splines 218 for ink smoothing 310, in real-time or otherwise. Given four points, a cardinal spline function gives a curve which passes through the middle two points, and is visually smooth (under any definition herein) with respect to all four points. Given points $P_1$, $P_2$, $P_3$, $P_4$, the cardinal spline function which passes through $P_2$ and $P_3$ is given by:

$$CS\text{-}P_1\text{-}P_2\text{-}P_3\text{-}P_4(t) = (2t^3 - 3t^2 + 1)^*P_2 + (-2t^3 + 3t^2)^*P_3 + \qquad (1)$$
$$(t^3 - 2t^2 + t)^*L^*(P_3 - P_1) + (t^3 - t^2)^*L^*(P_4 - P_2)$$

where L is the smoothness factor (e.g., 0.5), and t ranges from 0 to 1.

The cardinal spline function $CS\text{-}P_1\text{-}P_2\text{-}P_3\text{-}P_4(t)$ ensures that the smoothed segment passes through points $P_2$ and $P_3$, maintaining the fidelity of the user's input. Similarly, once any 4 points have been captured, a curved segment can be rendered for those 4 points. An entire stroke's worth of points is not needed in order to smooth sections of the curve, so changes made by redrawing part of a curve can be done rapidly to a recently drawn portion as the curve is being drawn by the user, instead of startling a user by changing an entire curve after the stylus is lifted.

In some embodiments, redrawing code 204 uses the following smoothing algorithm:
As input points are read in (gotten 302), the following occurs:
A) When the first ink point 208 is read ($P_1$)
   a. render 334 a round stamp at the point location 236
   b. checkpoint 330 the vertex buffer 202
B) When the next ink point is read ($P_2$)
   a. render a rectangular segment from $P_1$ to $P_2$
   b. render a round stamp at $P_2$
C) When the next ink point is read ($P_3$)
   a. revert 304 the vertex buffer back to the checkpoint in (A)
   b. compute 322 $\{c_{pre}, P_1, P_2, c_{post}\}$=GetControlPoints($P_1$, $P_2$)
   c. redraw by rendering 334 to add 306 the cardinal spline 326 smoothed segment connecting $P_1$ and $P_2$ using $CS\text{-}C_{pre}\text{-}P_1\text{-}P_2\text{-}C_{post}(t)$ for intervals of t which are visually appealing (namely, visually smooth).
   d. checkpoint the vertex buffer
   e. compute $\{c_{pre}, P_2, P_3, C_{post}\}$=GetControlPoints($P_2$, $P_3$)
   f. render the cardinal spline smoothed segment connecting $P_2$ and $P_3$ using $CS\text{-}C_{pre}\text{-}P_2\text{-}P_3\text{-}C_{post}(t)$ for intervals of t which are visually appealing.
   g. render a round stamp at $P_3$
D) As next points are read (PN), apply the same logic as to $P_3$
   a. Revert the vertex buffer back to the previous checkpoint
   b. compute $\{c_{pre}, P_{n-2}, P_{n-1}, c_{post}\}$=GetControlPoints($P_{n-2}$, $P_{n-1}$)
   c. render the cardinal spline smoothed segment connecting $P_{n-2}$ and $P_{n-1}$ using $CS\text{-}C_{pre}\text{-}P_{n-2}\text{-}P_{n-1}\text{-}C_{post}(t)$ for intervals of t which are visually appealing (i.e., visually smooth).
   d. checkpoint the vertex buffer
   e. compute $\{C_{pre}, P_{n-1}, P_n, C_{post}\}$=GetControlPoints($P_{n-1}$, $P_n$)
   f. render the cardinal spline smoothed segment connecting $P_{n-1}$ and $P_n$ using $CS\text{-}C_{pre}\text{-}P_{n-1}\text{-}P_n\text{-}C_{post}(t)$ for intervals of t which are visually appealing.
   g. render a round stamp at $P_n$ GetControlPoints is a helper function to assist programmatically. It has pseudocode:

```
GetControlPoints(Point P_B, Point P_C)
    if (P_B == P_0)        // first point in the stroke
        P_A = P_B;         // fake point to draw first line segment
    else
        P_A = P_{B-1};
    if (P_C == P_{n-1})    // last point in the stroke
        P_D = P_C + (P_C−P_B)/2; // fake up 4^th point
    else
        P_D = P_{n+1};
    return {P_A, P_B, P_C, P_D}
```

FIG. 5 shows this smoothing technique used smoothing the same curve as in FIG. 4. This smoothed curve is visually appealing.

With regard to performance, note that in this example the cardinal spline code is written to take advantage of modern single-instruction-multiple-data (SIMD) instructions. Given points $P_1$, $P_2$, $P_3$, $P_4$, one code to draw twenty straight line segments between $P_2$ and $P_3$ (to draw a smoothed line between $P_2$ and $P_3$) is:

```
for (i=0; i<20; i++) {
    float t = i / (float)19;
    smoothedPoints[i] = (2t³ - 3t² + 1) * P₂ +
                        (-2t³ + 3t²) * P₃ +
                        (t³ - 2t² + t) * L * (P₃ - P₁) +
                        (t³ - t²) * L * (P₄ - P₂),
}
```

Taking advantage of SIMD architecture allows four iterations of this for-loop to be computed at the same time:

```
for (i=0; i<20; i+=4) {
    float t = {i, i+1, i+2, i+3} / (float)19,
    smoothedPoints[i:i+3] = (2t³ - 3t² + 1) * P₂ +
                            (-2t³ + 3t²) * P₃ +
                            (t³ - 2t² + t) * L * (P₃ - P₁) +
                            (t³ - t²) * L * (P₄ - P₂);
}
```

This use of SIMD yields a speedup which facilitates (and in some circumstances permits) real-time ink smoothing.

The following discussion is derived in part from Project Code Name Austin ("Austin") documentation. Austin includes a program implemented by Microsoft Corporation to help illustrate the power and performance of the C++ programming language. Aspects of the Austin program and/or documentation are consistent with or otherwise illustrate aspects of the embodiments described herein. However, it will be understood that Austin documentation and/or implementation choices do not necessarily constrain the scope of such embodiments, and likewise that Austin and/or its documentation contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure. In the event of an inconsistency, this document governs over what appears in Austin code or documentation.

With regard to ink smoothing, consider first a straightforward ink drawing mechanism: draw straight lines between each stylus input point that is sampled. Some devices and drivers sample 120 input points per second. This may seem like a lot, but very swift strokes can sometimes cause visible straight edges. FIG. 4 shows a sample from a prototype application (without ink smoothing) which shows some straight edges. FIG. 5 shows the same set of ink strokes, but with the ink strokes smoothed.

Some implementations use a spline technique to do real-time ink smoothing. Other options may be considered, but the spline can be done in real-time so the strokes you draw are always smooth as new input points are sampled, and is computationally feasible. Although much has been written about spline smoothing techniques, many descriptions are too simplistic, or else they are extremely complex and hard to understand, or they do not provide the capabilities described here.

Before computers, a technique was used to create smoothed curves using a tool called a spline. This was a flexible material (heavy rope, a flexible piece of wood, etc.) that could bend, but also be fixed at certain locations along its body. For example, you could take a piece of heavy rope, pin the rope to a wall using pins in different locations along the rope, and then trace the outline of the bendy rope to yield a spline-smoothed curve.

Fast forward several decades and now we are using the same principles to create a smoothed line between a set of points. Say we have a line with many points P0, P1, P2, ... To smooth it using a spline, we take the first 4 points (P0, P1, P2, P3) and draw a smooth curve that passes through P1 and P2. Then we move the window of 4 points to (P1, P2, P3, P4) and draw a smooth curve that passes through P2 and P3. Repeat for the entire curve. The reason it's a spline technique is that we consider the two points as being 'pinned', just like pinning some rope to a wall.

Before going into how we draw the smoothed line between those points, let's examine the benefits. First, we only need four points to draw a smoothed line between the middle two. As you are drawing an ink stroke with your stylus, we are constantly able to smooth the stroke, so we can do real-time smoothing. Second, the computation is bounded, and by some neat compiler optimizations and limiting the number of samples when drawing the smoothed line (see below) we can ensure ink smoothing won't be on the critical path of performance.

One thing to keep in mind is drawing a smoothed line between the first two actual data points gotten (P0 and P1), as well as drawing the smoothed line between the last two actual data points on the curve. This can be done by faking up the requisite end points on each end of the curve and applying the same spline technique. Another thing to remember is that although we speak in terms of drawing a smoothed line between two points, in fact one can only draw a collection of straight lines that look smooth. So when we say "draw a smoothed line between two points" what we mean is "draw many straight lines that look smooth which connect two points". We sample points along the curved line at regular intervals which are known to look smooth at the pixel level.

When a graphics person says that a line is smooth at a given point, what they are often saying is that the line is continuous at that point, the first derivative of the line is continuous at that point, and the second derivative is continuous at that point. We can define each segment of a smoothed curve as being parameterized by a parameter "t" which goes from 0 to 1. A curve can be a concatenation of smaller curves, each parameterized on its own from 0 to 1 (for instance).

Using the character to mean derivative, applying the above definition of smooth at the endpoints of each of the segments yields a set of equations:

$$P01(t=1)=P12(t=0)P'01(t=1)=P'12(t=0)P''01(t=1)=P''12(t=0)$$

$$P12(t=1)=P23(t=0)P'12(t=1)=P'23(t=0)P''12(t=1)=P''23(t=0)$$

Solving such equations exactly is difficult and computationally expensive. In general, if you are looking for a polynomial to satisfy an equation with second derivatives, you are seeking a polynomial of degree 3, namely, a cubic polynomial. Hence the 'cubic' in cubic spline. For a more computationally feasible solution that looks just as smooth, we loosen the second derivative equations and say P''01 (t=1)~=P''12(t=0), etc. This opens up many possibilities—investigate any cubic spline and you'll see many options. After much experimenting, one of the present inventors found that the Cardinal spline works well for ink strokes. A cardinal spline solution for the smoothed curve between four points P0, P1, P2, P3 is given above as cardinal spline function CS-$P_1$-$P_2$-$P_3$-$P_4$(t) in formula (1). The formula can also be expressed in C++:

```
for (int i=0; i<numPoints; i++)
{
float t = (float)i/(float)(numPoints-1);
smoothedPoints_X[i] = (2*t*t*t - 3*t*t + 1) * p2x +
(-2*t*t*t + 3*t*t) * p3x +
(t*t*t - 2*t*t + t) * L*(p3x-1x) +
(t*t*t - t*t) * L*(p4x-p2x),
smoothedPoints_Y[i] = (2*t*t*t - 3*t*t + 1) * p2y +
(-2*t*t*t + 3*t*t) * p3y +
(t*t*t - 2*t*t + t) * L*(p3y-p1y) +
(t*t*t - t*t) * L*(p4y-p2y),
}
```

In this code, numPoints (the number of points to sample on our smoothed line) is based on the minimum interval for what the inventor decided was visually acceptable. In other discussion herein, numPoints corresponds to the value N.

As noted some embodiments do real-time ink smoothing. That is to say an ink stroke is smoothed as it is drawn. Steps such as using SIMD code and not solving smoothness equations exactly can be taken, to make sure that drawing a smooth line does not take so long that there is a drop in frame rate where the ink stroke perceptibly lags behind the stylus. One benefit of writing curve smoothing code in C++ is the opportunity to have compiler optimizations. In this particular case, the cardinal spline equations are auto-vectorized by the Microsoft® Visual Studio® 2012 C++ compiler (Microsoft and Visual Studio are marks of Microsoft Corporation). This yields a measured 30% performance boost when smoothing ink strokes, ensuring we can smooth ink points as fast as they are typically sampled (120 Hz). Also, any extra computing time saved lets us (a) do more computations to make the app better, or (b) finish our computations early, putting the app to sleep thus saving power.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification. Their elements and/or teachings may be copied word-for-word or paraphrased into the specification after filing without constituting new matter.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An automated digital ink curve smoothing method performed by a system which includes a computer-readable memory and a digital display having a frame buffer and also includes hardware that supports parallel processing, the method comprising:
   getting in the computer-readable memory a group of data points for a digital ink curve, the digital ink curve having a displayed curve rendering;

calculating in parallel multiple data points for a new section of the curve rendering, said calculating comprising using the hardware which supports parallel processing; and smoothing the digital ink curve using at least some of the calculated data points, thereby obtaining a smoothed digital ink curve which has a rendered spline that includes a portion that is visually smooth through at least two data points;

wherein a portion of a rendered spline is considered visually smooth when the portion has $G^1$ continuity, and the smoothing is performed at least in part by overwriting a portion of frame buffer old data with frame buffer new data from a checkpoint forward, and the frame buffer old data represented an old section of the curve rendering, and the frame buffer new data represents the new section of the curve rendering.

2. The automated curve smoothing method of claim 1, wherein using the hardware which supports parallel processing comprises using single instruction multiple data processing to calculate spline data.

3. The automated curve smoothing method of claim 1, wherein using the hardware which supports parallel processing comprises using single instruction multiple data processing to simultaneously calculate frame buffer data for multiple data points for the new section of the curve rendering.

4. The automated curve smoothing method of claim 1, wherein using the hardware which supports parallel processing comprises using single instruction multiple data CPU instructions.

5. The automated curve smoothing method of claim 1, wherein using the hardware which supports parallel processing comprises using one or more single instruction multiple data instructions to compute multiple iterations of a for loop at the same time.

6. The automated curve smoothing method of claim 1, wherein using the hardware which supports parallel processing comprises running different threads on different cores.

7. The automated curve smoothing method of claim 1, wherein using the hardware which supports parallel processing comprises running at least one thread on a general purpose processor core and running at least one other thread on a graphics processor core.

8. The automated curve smoothing method of claim 1, wherein using the hardware which supports parallel processing comprises executing instructions on at least two processors, each processor being one of the following: a central processing unit, an arithmetic and logic unit, a floating point processing unit, or a graphical processing unit.

9. A computer-readable storage medium configured with data and with instructions that when executed by a machine having at least a computer-readable memory, a graphics processor (GPU), and a digital display with a frame buffer, causes the machine to perform a technical method for redrawing a digital ink curve, the method comprising:

getting in the computer-readable memory a group G of one or more recent data points for a curve, the data points in the group G being the most recent data points in a sequence S of data points for the curve, the group G not containing all of the data points in S, the curve having a curve rendering which corresponds to the sequence S;

the GPU calculating at least one data point for a new section of the curve rendering; and redrawing a most recent section of the curve rendering as data points are added to the sequence S, without thereby changing the entire curve rendering, the redrawn most recent section including a rendered spline that includes a portion which is visually smooth through at least two data points;

wherein a portion of a rendered spline is considered visually smooth when any two parts of the visually smooth portion which meet at a point share a common tangent direction at the point where those two parts meet, and the redrawing step is performed at least in part by overwriting a portion of frame buffer old data with frame buffer new data from a checkpoint forward, and the frame buffer old data represented an old section of the curve rendering, and the frame buffer new data represents the new section of the curve rendering.

10. The configured storage medium of claim 9, in which the machine includes single instruction multiple data processing hardware utilized by the method.

11. The configured storage medium of claim 9, in which the method comprises simultaneously calculating frame buffer data for multiple data points for the new section of the curve rendering.

12. The configured storage medium of claim 9, wherein the method comprises redrawing the most recent section of the curve rendering in real-time as data points are added to the sequence S.

13. The configured storage medium of claim 9, wherein the GPU calculates multiple data points for the new section of the curve rendering.

14. A computer graphics system comprising:

at least two processors;

an instruction memory in operable communication with the processors;

a digital ink display having a frame buffer in operable communication with the logical processors;

a curve redrawing code which resides in the instruction memory and which upon execution using at least two processors will perform a technical method comprising:

getting a group G of data points for a digital ink curve, the data points in the group G being the most recent data points in a sequence S of data points for the digital ink curve, the digital ink curve having on the digital ink display a curve rendering which corresponds to the sequence S;

at least two processors of the system calculating in parallel multiple data points for a new section of the curve rendering; and redrawing a most recent section of the curve rendering as the curve is being interactively rendered on the digital ink display, without thereby changing the entire curve rendering, the redrawn most recent section including a rendered spline that includes a portion which is visually smooth through at least two data points;

wherein a portion of a rendered spline is considered visually smooth when any two parts of the visually smooth portion which meet at a point share a common tangent direction at the point where those two parts meet, and redrawing is performed at least in part by overwriting a portion of frame buffer old data with frame buffer new data from a checkpoint forward, and the frame buffer old data represented an old section of the curve rendering, and the frame buffer new data represents the new section of the curve rendering.

15. The computer graphics system of claim 14, wherein the system comprises a single instruction multiple data processing architecture, and the curve redrawing code uses the single instruction multiple data processing architecture to simultaneously calculate frame buffer data for multiple data points for the new section of the curve rendering.

16. The computer graphics system of claim 14, wherein the system supports parallel processing by running different threads of the curve redrawing code on different cores of the system.

17. The computer graphics system of claim 14, wherein the system supports parallel processing by running at least one thread of the curve redrawing code on a general purpose processor core and running at least one other thread of the curve redrawing code on a graphics processor core.

18. The computer graphics system of claim 14, wherein the system supports parallel processing by executing instructions of the curve redrawing code on at least two processor cores, each core being a core of a processor which is one of the following: a central processing unit, an arithmetic and logic unit, a floating point processing unit, or a graphical processing unit.

19. The computer graphics system of claim 14, wherein the curve redrawing code uses one or more single instruction multiple data instructions to compute multiple iterations of a for loop at the same time.

20. The computer graphics system of claim 14, wherein the system comprises a tablet device containing the digital ink display.

\* \* \* \* \*